(12) United States Patent　　(10) Patent No.:　US 12,608,924 B2
Cho　　(45) Date of Patent: 　Apr. 21, 2026

(54) OBJECT REGION SEGMENTATION DEVICE AND OBJECT REGION SEGMENTATION METHOD THEREOF

(71) Applicants: HYUNDAI MOTOR COMPANY, Seoul (KR); KIA CORPORATION, Seoul (KR)

(72) Inventor: Jae Hoon Cho, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 385 days.

(21) Appl. No.: 18/508,967

(22) Filed: Nov. 14, 2023

(65) Prior Publication Data

US 2024/0338934 A1　　Oct. 10, 2024

(30) Foreign Application Priority Data

Apr. 4, 2023　　(KR) ........................ 10-2023-0044302

(51) Int. Cl.
　*G06V 10/774*　　(2022.01)
　*G06N 3/0895*　　(2023.01)
　　　　(Continued)

(52) U.S. Cl.
　CPC ....... *G06V 10/7753* (2022.01); *G06N 3/0895* (2023.01); *G06T 7/11* (2017.01);
　　　　(Continued)

(58) Field of Classification Search
　CPC .. G06V 10/7753; G06V 10/267; G06V 10/75; G06V 10/764; G06V 10/776;
　　　　(Continued)

(56) References Cited

U.S. PATENT DOCUMENTS

2019/0130220 A1　 5/2019 Zou et al.
2019/0259153 A1* 8/2019 Zhang ................... G06V 10/82
　　　　(Continued)

FOREIGN PATENT DOCUMENTS

CN　　 109614921 A　 * 4/2019 ............. G06N 3/045
CN　　 111783811 A　 * 10/2020 ........... G06F 18/241
　　　　(Continued)

OTHER PUBLICATIONS

Q. Xu et al., "Semi-supervised Medical Image Segmentation with Confidence Calibration," 2021 International Joint Conference on Neural Networks (IJCNN), Shenzhen, China, 2021, pp. 1-8 (Year: 2021).*

(Continued)

*Primary Examiner* — Andrew M Moyer
*Assistant Examiner* — Mario Anthony Rodin
(74) *Attorney, Agent, or Firm* — Lempia Summerfield Katz LLC

(57) ABSTRACT

An object region segmentation device and an object region segmentation method thereof are provided. The object region segmentation device includes a processor and storage. The storage stores a deep-learning network model for segmenting an object region in an image. The deep-learning network model includes a first network model for generating a pseudo label, a second network model for generating a confidence map for the pseudo label, and a third network model for segmenting the object region in the image. The processor inputs an unlabeled image to the first network model to generate the pseudo label, inputs the pseudo label to the second network model to generate the confidence map, and trains the third network model using a pseudo label corresponding to at least one pixel, a confidence level of which is greater than or equal to a threshold, on the confidence map.

20 Claims, 10 Drawing Sheets

(51) Int. Cl.

| | |
|---|---|
| *G06T 7/11* | (2017.01) |
| *G06T 7/136* | (2017.01) |
| *G06V 10/26* | (2022.01) |
| *G06V 10/75* | (2022.01) |
| *G06V 10/764* | (2022.01) |
| *G06V 10/776* | (2022.01) |
| *G06V 10/82* | (2022.01) |
| *G06V 10/94* | (2022.01) |
| *G06V 20/70* | (2022.01) |

(52) U.S. Cl.

CPC ............ *G06T 7/136* (2017.01); *G06V 10/267* (2022.01); *G06V 10/75* (2022.01); *G06V 10/764* (2022.01); *G06V 10/776* (2022.01); *G06V 10/82* (2022.01); *G06V 10/945* (2022.01); *G06V 20/70* (2022.01); *G06T 2207/20081* (2013.01); *G06T 2207/20084* (2013.01)

(58) Field of Classification Search

CPC ...... G06V 10/82; G06V 10/945; G06V 20/70; G06T 7/11; G06T 7/136; G06T 2207/20081; G06T 2207/20084; G06N 3/0895

See application file for complete search history.

(56) References Cited

U.S. PATENT DOCUMENTS

| | | | |
|---|---|---|---|
| 2020/0160175 A1 | 5/2020 | Vahdat et al. | |
| 2020/0380304 A1 | 12/2020 | Sallee et al. | |
| 2021/0166347 A1 | 6/2021 | Arani et al. | |

FOREIGN PATENT DOCUMENTS

| | | | | | |
|---|---|---|---|---|---|
| CN | 112381098 A | * | 2/2021 | ........... | G06F 18/214 |
| CN | 113326848 A | * | 8/2021 | ......... | G06F 18/2415 |
| CN | 113781390 A | * | 12/2021 | ............. | G06N 3/045 |
| CN | 113902758 A | * | 1/2022 | ......... | G06F 18/2415 |
| KR | 20200077321 A | | 6/2020 | | |
| KR | 20220041463 A | * | 4/2022 | ............. | G06N 3/045 |
| WO | WO-2022194398 A1 | * | 9/2022 | ......... | G06F 18/2155 |
| WO | 2022219376 A1 | | 10/2022 | | |

OTHER PUBLICATIONS

Liu, Jiawei & Barnes, Nick. "Semi-supervised Salient Object Detection with Effective Confidence Estimation," 2021. (Year: 2021).*

Shen et al., "Co-training with high-confidence pseudo labels for semi-supervised medical image segmentation," In Proceedings of the Thirty-Second International Joint Conference on Artificial Intelligence (IJCAI '23), 2023, Article 467, 4199-4207. (Year: 2023).*

* cited by examiner

200

PSEUDO LABEL
GENERATION
NETWORK MODEL
210

CONFIDENCE MAP
GENERATION
NETWORK MODEL
220

SEGMENTATION
NETWORK MODEL
230

START

INPUT UNLABELED IMAGE TO
FIRST NETWORK MODEL
TO GENERATE PSEUDO LABEL — 910

INPUT PSEUDO LABEL TO
SECOND NETWORK MODEL TO
GENERATE CONFIDENCE MAP — 920

TRAIN THIRD NETWORK MODEL USING
PSEUDO LABEL CORRESPONDING TO AT
LEAST ONE PIXEL, CONFIDENCE LEVEL
OF WHICH IS GREATER THAN OR EQUAL
TO THRESHOLD, ON CONFIDENCE MAP — 930

END

OBJECT REGION SEGMENTATION DEVICE AND OBJECT REGION SEGMENTATION METHOD THEREOF

CROSS-REFERENCE TO RELATED APPLICATION

This application claims the benefit of priority to Korean Patent Application No. 10-2023-0044302, filed in the Korean Intellectual Property Office on Apr. 4, 2023, the entire contents of which are incorporated herein by reference.

TECHNICAL FIELD

The present disclosure relates to an object region segmentation device and an object region segmentation method thereof, and more particularly, relates to technologies of training a deep-learning network model for segmenting an object region in an image and segmenting an object region in an unlabeled image using the trained network model.

BACKGROUND

Semantic segmentation is variously used to recognize surrounding situations and spaces, for example, recognize vehicles, lines, and drivable areas (or free spaces) using cameras in an autonomous driving situation.

Deep neural network-based segmentation techniques construct large datasets including a high-quality label and perform supervised learning using such datasets, thus improving performance.

SUMMARY

The present disclosure has been made to solve the above-mentioned problems occurring in the prior art while advantages achieved by the prior art are maintained.

An aspect of the present disclosure provides an object region segmentation device for improving the performance of a deep-learning network model for segmenting an object region in an image although training is performed using a small amount of labeled data, and an object region segmentation method thereof.

Another aspect of the present disclosure provides an object region segmentation device for mitigating dependence on massive labeled data sets and reducing costs and time taken to collect labeled data, and an object region segmentation method thereof.

The technical problems to be solved by the present disclosure should not be limited to the aforementioned problems. Any other technical problems not mentioned herein should be clearly understood from the following description by those having ordinary skill in the art to which the present disclosure pertains.

According to an aspect of the present disclosure, an object region segmentation device may include a processor and storage. The storage may store a deep-learning network model for segmenting an object region in an image. The deep-learning network model may include a first network model for generating a pseudo label, a second network model for generating a confidence map for the pseudo label, and a third network model for segmenting the object region in the image. The processor may be configured to: input an unlabeled image to the first network model to generate the pseudo label; input the pseudo label to the second network model to generate the confidence map; and train the third network model using a pseudo label corresponding to at least one pixel on the confidence map, where a confidence level of the at least one pixel is greater than or equal to a threshold.

In an embodiment, the processor may be configured to train the first network model using labeled data.

In an embodiment, the processor may be configured to: compare a pixel at the same location of the pseudo label and a correct answer label; generate a ground truth confidence map which is "1" when the pixel has the same class as a result of the comparison and is "0" when the pixel has a different class as a result of the comparison; and train the second network model based on the pseudo label and the ground truth confidence map.

In an embodiment, the confidence map may be expressed as a value between "0" and "1". The confidence map may be expressed as a value closer to "1" as the confidence level is higher and may be expressed as a value closer to "0" as the confidence level is lower.

In an embodiment, the processor may be configured to: generate a mask where a pixel, the confidence level of which is greater than or equal to the threshold, is "1" and where a pixel, the confidence level of which is less than the threshold, is "0"; perform multiplication between the pixels of the mask and the pseudo label; and train the third network model based on the pseudo label where the multiplication between the pixels is performed.

In an embodiment, the processor may be configured to train the third network model using a semi-supervised learning technique.

In an embodiment, the processor may be configured to: train the third network model using labeled data; generate pseudo-labeled data using the pseudo label corresponding to the at least one pixel, the confidence level of which is greater than or equal to the threshold; and train the third network model using the pseudo-labeled data.

In an embodiment, the second network model may include an encoder and a decoder. The processor may be configured to: extract a first feature from a red, green, and blue (RGB) image of the unlabeled image using the encoder; extract a second feature from a pseudo label generated from the unlabeled image using the encoder; concatenate the first feature and the second feature to generate a third feature; and decode the third feature using the decoder.

In an embodiment, the third network model may have a loss function which is the sum of cross entropy for labeled data and cross entropy for data corresponding to the at least one pixel, the confidence level of which is greater than or equal to the threshold, among unlabeled data. The processor may be configured to train the third network model such that a value of the loss function is minimized.

In an embodiment, the processor may be configured to set the threshold based on a user input.

According to another aspect of the present disclosure, an object region segmentation method performed by an object region segmentation device may include: inputting an unlabeled image to a first network model to generate a pseudo label, the first network model being configured to generate the pseudo label; inputting the generated pseudo label to a second network model to generate a confidence map for the pseudo label, the second network model being configured to generate the confidence map; and training a third network model configured to segment an object region in an image using a pseudo label corresponding to at least one pixel on the confidence map, where a confidence level of the at least one pixel is greater than or equal to a threshold.

In an embodiment, the object region segmentation method may further include training the first network model using labeled data.

In an embodiment, the object region segmentation method may further include comparing a pixel at the same location of the pseudo label and a correct answer label, generating a ground truth confidence map which is "1" when the pixel has the same class as a result of the comparison and is "0" when the pixel has a different class as a result of the comparison, and training the second network model based on the pseudo label and the ground truth confidence map.

In an embodiment, the confidence map may be expressed as a value between "0" and "1". The confidence map may be expressed as a value closer to "1" as the confidence level is higher and may be expressed as a value closer to "0" as the confidence level is lower.

In an embodiment, the training of the third network model may include: generating a mask where a pixel, the confidence level of which is greater than or equal to the threshold, is "1" and where a pixel, the confidence level of which is less than the threshold, is "0"; performing multiplication between the pixels of the mask and the pseudo label; and training the third network model using the pseudo label where the multiplication between the pixels is performed.

In an embodiment, the training of the third network model may include training the third network model using a semi-supervised learning technique.

In an embodiment, the training of the third network model may include: training the third network model using labeled data; generating pseudo-labeled data using the pseudo label corresponding to the at least one pixel, the confidence level of which is greater than or equal to the threshold; and training the third network model using the pseudo-labeled data.

In an embodiment, the second network model may include an encoder and a decoder. The generating of the confidence map may include: extracting a first feature from an RGB image of the unlabeled image using the encoder; extracting a second feature from a pseudo label generated from the unlabeled image using the encoder; concatenating the first feature and the second feature to generate a third feature; and decoding the third feature using the decoder.

In an embodiment, the third network model may have a loss function which is the sum of cross entropy for labeled data and cross entropy for data corresponding to the at least one pixel, the confidence level of which is greater than or equal to the threshold, among unlabeled data. The training of the third network model may include training the third network model such that a value of the loss function is minimized.

In an embodiment, the object region segmentation method may further include setting the threshold based on a user input.

BRIEF DESCRIPTION OF THE DRAWINGS

The above and other objects, features and advantages of the present disclosure should be more apparent from the following detailed description taken in conjunction with the accompanying drawings.

DETAILED DESCRIPTION

Figure 1:
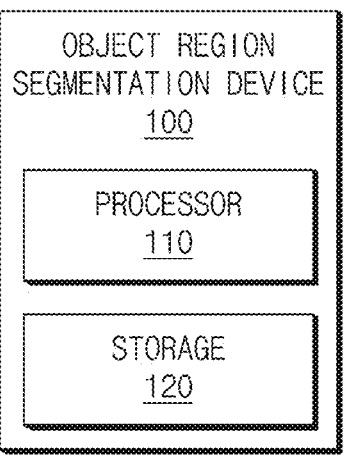
FIG. 1 is a block diagram illustrating a configuration of an object region segmentation device according to an embodiment of the present disclosure.

Hereinafter, some embodiments of the present disclosure are described in detail with reference to the accompanying drawings. In adding the reference numerals to the components of each drawing, it should be noted that the identical component is designated by the identical numerals even when they are displayed on other drawings. Further, in describing an embodiment of the present disclosure, a detailed description of well-known features or functions is ruled out in order not to unnecessarily obscure the gist of the present disclosure.

In describing the components of an embodiment according to the present disclosure, terms such as first, second, "A", "B", (a), (b), and the like may be used. These terms are merely intended to distinguish one component from another component, and the terms do not limit the nature, sequence, or order of the corresponding components. Furthermore, unless otherwise defined, all terms including technical and scientific terms used herein have the same meaning as being generally understood by those having ordinary skill in the art to which the present disclosure pertains. Such terms as those defined in a generally used dictionary are to be interpreted as having meanings equal to the contextual meanings in the relevant field of art and are not to be interpreted as having ideal or excessively formal meanings unless clearly defined as having such in the present application.

Hereinafter, embodiments of the present disclosure are described in detail with reference to FIGS. 1-10.

When a component, device, element, or the like, of the present disclosure is described as having a purpose or performing an operation, function, or the like, the component, device, or element should be considered herein as being "configured to" meet that purpose or to perform that operation or function.

FIG. 1 is a block diagram illustrating a configuration of an object region segmentation device according to an embodiment of the present disclosure.

Referring to FIG. 1, an object region segmentation device 100 according to an embodiment of the present disclosure may include a processor 110 and storage 120. The processor 110 may be operatively connected with the storage 120. The processor 110 may execute instructions stored in the storage 120 to perform operations described below.

The processor 110 may train a deep-learning network model for segmenting an object region in an image. For example, the processor 110 may train a network model for segmenting an object region in an image using a semi-supervised learning technique. The semi-supervised learning technique is a learning technique that uses both supervised learning using a small amount of labeled data (e.g., data with a correct answer label) and unsupervised learning using a large amount of unlabeled data (e.g., data with no correct answer label). The supervised learning in the semi-supervised learning may be referred to as primary learning, and the unsupervised learning in the semi-supervised learning may be referred to as secondary learning.

For example, the processor 110 may use a pseudo labeling technique as the secondary learning of the semi-supervised learning. The pseudo labeling is a technique for predicting unlabeled data using a model primarily trained through supervised learning and randomly performing correct answer labeling of the predicted result to use it.

For example, the deep-learning network model for segmenting the object region in the image may include: a pseudo label generation network model for generating a pseudo label; a confidence map generation network model for generating confidence map for the pseudo label; and a segmentation network model for segmenting the object region in the image.

For example, the processor 110 may generate a pseudo label for unlabeled data using the pseudo label generation network model. The processor 110 may generate a pseudo label for unlabeled data using the pseudo label generation network model trained based on the labeled data. For example, the processor 110 may train the pseudo label generation network model using training data where a red, green, and blue (RGB) image is an input and a correct answer label which is the result of segmenting the object region for the RGB image is an output. The result of segmenting the object region may include, for example, a color value corresponding to an object class on a pixel-by-pixel basis.

The processor 110 may generate a confidence map to detect and supplement an error in a pseudo label. The processor 110 may generate a confidence map corresponding to a pseudo label for unlabeled data using a confidence map generation network model trained based on a pseudo label generated from labeled data and a correct answer label of the labeled data.

For example, the processor 110 may compare a pixel at the same location of the pseudo label generated from the labeled data and the correct answer label of the labeled data. The processor 110 may generate a ground truth (GT) confidence map which is "1" when the pixel of the pseudo label and the pixel of the correct answer label have the same class as a result of the comparison and is "0" when the pixel of the pseudo label and the pixel of the correct answer label have different classes as a result of the comparison. The processor 110 may train the confidence map generation network model based on the pseudo label and the ground truth confidence map. The processor 110 may train the confidence map generation network model using training data where the pseudo label is an input and the ground truth confidence map is an output.

For example, the processor 110 may input the pseudo label generated using the pseudo label generation network model to the confidence map generation network model to generate the confidence map. For example, the confidence map may be expressed as a value between "0" and "1". For example, each pixel value of the confidence map may be a value between "0" and "1". For example, each pixel value of the confidence map may be expressed as a value closer to "1" as the confidence level is higher and may be expressed as a value closer to "0" as the confidence level is lower.

For example, to accurately generate the confidence map, the processor 110 may further use a red, green, and blue (RGB) image corresponding to the pseudo label when generating the confidence map. For example, the processor 110 may further use the RGB image corresponding to the pseudo label as an input image, as well as the pseudo label. The processor 110 may input the pseudo label and the RGB image corresponding to the pseudo label to the confidence map generation network model, extract features from each of the pseudo label and the RGB image, concatenate the extracted features, and decode the concatenated feature to generate the confidence map.

The processor 110 may selectively use a pseudo label with a high confidence level as training data of the segmentation network model based on the confidence map. The processor 110 may use a pseudo label corresponding to at least one pixel, the confidence level of which is greater than or equal to a threshold, on the confidence map as training data of the segmentation network model. For example, the processor 110 may set the threshold based on a user input.

For example, the processor 110 may generate a mask where a pixel, the confidence level of which is greater than or equal to the threshold, on the confidence map is "1" and a pixel, the confidence level of which is less than the threshold, on the confidence map is "0". The processor 110 may perform multiplication between the pixels of the mask and the pseudo label. The processor 110 may use a pseudo label where the multiplication between the pixels with the mask is performed as training data of the segmentation network model.

The processor 110 may train the segmentation network model using the pseudo label corresponding to the at least one pixel on the confidence map, where the confidence level of the at least one pixel is greater than or equal to the threshold. For example, the processor 110 may train the segmentation network model using the pseudo label where the multiplication between the pixels with the mask is performed.

For example, the processor 110 may train the segmentation network model using the semi-supervised learning technique. The processor 110 may train the segmentation network model using a small amount of labeled data and a large amount of pseudo-labeled data. For example, the processor 110 may train the segmentation network model using the labeled data. The processor 110 may generate a pseudo label and a confidence map from unlabeled data. The processor 110 may generate pseudo-labeled data using the pseudo label corresponding to the at least one pixel on the confidence map, where the confidence level of the at least one pixel is greater than or equal to the threshold. The processor 110 may train the segmentation network model using the pseudo-labeled data.

For example, the processor 110 may train the segmentation network model such that a value of a loss function of the segmentation network model is minimized. For example, the loss function of the segmentation network model may be the sum of a loss function of supervised learning and a loss function of unsupervised learning. The loss function of the segmentation network model may be expressed as Equation 1 below. In Equation 1 below, $L_{total}$ refers to the entire loss function, $L_{sup}$ refers to the loss function of the supervised learning, and $L_{unsup}$ refers to the loss function of the unsupervised learning.

$$L_{total} = L_{sup} + L_{unsup} \qquad \text{[Equation 1]}$$

For example, the loss function may be indicated as cross entropy. For example, function of the loss segmentation network model may be indicated as a standard pixel-wise cross entropy between a segmentation prediction result value and a label corresponding to the segmentation prediction result value. The loss function of the segmentation network model may be expressed as Equation 2 below. In Equation 2 below, $\hat{Y}$ refers to the segmentation prediction result value, Y refers to the label corresponding to the prediction result value, i refers to the index indicating each pixel of the input image, $Y_i$ refers to the one-hot vector of the ground truth of the pixel, and T refers to the transpose.

$$L_{ce}(\hat{Y}, Y) = -\sum_i Y_i^T \cdot \log(\hat{Y}_i) \qquad \text{[Equation 2]}$$

For example, the loss function of the supervised learning may be indicated as cross entropy for labeled data. For example, the loss function of the supervised learning may be expressed as Equation 3 below. In Equation 3 below, $D_L$ refers to the labeled data. $L_{ce}$ of Equation 3 below may be calculated using Equation 2 above.

$$L_{sup} = \frac{1}{|D_L|} \sum_{X \in D_L} L_{ce}(\hat{Y}, Y) \qquad \text{[Equation 3]}$$

For example, the loss function of the unsupervised learning may be indicated as cross for data entropy corresponding to at least one pixel, the confidence level of which is greater than or equal to the threshold, among unlabeled data. For example, the loss function of the unsupervised learning may be expressed as Equations 4 and 5 below. In Equation 4 below, $D_U$ refers to the unlabeled data, M refers to the mask, and P refers to the pseudo label. In Equation 5 below, C(i) refers to the confidence level (or the confidence level value), and t refers to the threshold. $L_{ce}$ of Equation 4 below may be calculated using Equation 2 above. For example, τ may be a hyper-parameter, which may be set by a user input. A user may set τ to adjust the amount of values for an inaccurate pixel of the pseudo label.

$$L_{unsup} = \frac{1}{|D_U|} \frac{1}{\sum_i M_i} \sum_{X \in D_U} \sum_i M_i \cdot L_{ce}(\hat{Y}_i, P_i) \qquad \text{[Equation 4]}$$

$$M_i = \begin{cases} 1, & \text{if } C(i) \geq \tau \\ 0, & \text{if } C(i) < \tau \end{cases} \qquad \text{[Equation 5]}$$

The storage 120 may store instructions executed by the processor 110. The storage 120 may store data necessary for the processor 110 to perform an operation. For example, the storage 120 may store a deep-learning network model for segmenting an object region in an image. For example, the storage 120 may store a pseudo label generation network model for generating a pseudo label, a confidence map generation network model for generating a confidence map for the pseudo label, and a segmentation network model for segmenting an object region in an image. The above-mentioned models may be implemented as, for example, one integrated model.

For example, the storage 120 may store labeled data, unlabeled data, and/or pseudo-labeled data as training data of the network model. For example, the storage 120 may train a network model before being trained using the training data.

The storage 120 may store data or information processed by the processor 110. For example, the storage 120 may store a network model after being trained using training data. For example, the storage 120 may store the result of segmenting the object region using the trained network model. For example, the storage 120 may store the result of segmenting the object region, which is obtained by inputting an unlabeled image obtained by means of a camera of a vehicle to the trained network model.

For example, the object region segmentation device 100 may be implemented in a vehicle (e.g., an autonomous vehicle). The object region segmentation device 100 may be integrally configured with control units in the vehicle or may be implemented as a separate device to be connected with the control units of the vehicle by a separate connection means.

For example, the object region segmentation device 100 may generate a pseudo label and a confidence map corresponding to the pseudo label from unlabeled data obtained from at least one camera (e.g., a front view camera, a left/right view camera, and/or a rear view camera) loaded into or onto the vehicle. The object region segmentation device 100 may selectively use a reliable pseudo label based on the confidence map to train the network model for segmenting the object region in the image. For example, the object region segmentation device 100 may perform object region segmentation for new data obtained by means of the at least one camera using the trained network model.

For example, the object region segmentation device 100 may transmit object region segmentation information obtained by performing the object region segmentation to the control units of the vehicle. The control units of the vehicle may recognize surrounding situations including another vehicle, a line, and/or a drivable area using the object region segmentation information and may control autonomous driving of the vehicle based on the recognized surrounding situations.

The above-mentioned embodiment may implement the device for segmenting the object region in the image. However, according to various embodiments, the above-mentioned method for training and operating the network model may be applied to a network model for estimating a depth of an object in an image. For example, the network model for estimating the depth may set a light detection and ranging (LiDAR) point obtained using the LiDAR sensor to a ground truth and may learn a relationship between an input image and the LiDAR point. Because it is physically expensive and takes a lot of time to obtain the LiDAR point, and because the obtained image is only about 6% of the entire resolution of the image, the amount of training data may be insufficient. In training the network model for estimating the depth, the amount of training data may be ensured using pseudo labeling according to the above-mentioned embodiment, the confidence map may be generated for the pseudo label, and the reliable pseudo label may be selectively used based on the confidence map to improve the quality of the training data.

Figure 2:
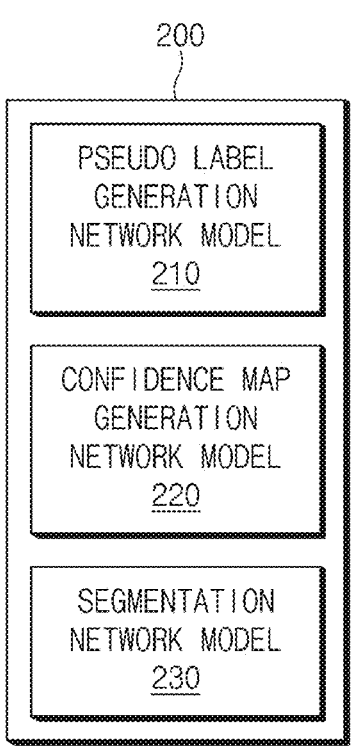
FIG. 2 is a drawing illustrating a network model for segmenting an object region according to an embodiment of the present disclosure.

FIG. 2 is a drawing illustrating a network model for segmenting an object region according to an embodiment of the present disclosure. A network model 200 shown in FIG. 2 may be stored in an object region segmentation device 100 of FIG. 1 or storage 120 of the object region segmentation device 100.

Referring to FIG. 2, the network model 200 may be a network model for segmenting an object region in an image. The network model 200 may include a pseudo label generation network model 210, a confidence map generation network model 220, and a segmentation network model 230. Operations of the network models, which are described below, may be performed by the object region segmentation device 100 of FIG. 1 or a processor 110 of the object region segmentation device 100.

The pseudo label generation network model 210 may generate a pseudo label for an input. The pseudo label generation network model 210 may be trained using labeled data. For example, the pseudo label generation network model 210 may be trained using training data where an RGB image is an input and a correct answer label which is the result of segmenting an object region for the RGB image is an output. The trained pseudo label generation network model 210 may receive an RGB image of unlabeled data and may generate a pseudo label corresponding to the received RGB image.

The pseudo label generation network model 210 may be implemented using, for example, a vision transformer model, but not limited thereto.

The confidence map generation network model 220 may generate a confidence map for the pseudo label. For example, the confidence map generation network model 220 may be trained based on a pseudo label generated from labeled data and a ground truth confidence map. For example, the ground truth confidence map may be generated by comparing a pixel at the same location of the pseudo label generated from the labeled data and the correct answer label of the labeled data. For example, each pixel value of the ground truth confidence map may be determined as "1", when the pixel of the pseudo label and the pixel of the correct answer label have the same class, and may be determined as "0", when the pixel of the pseudo label and the pixel of the correct answer label have different classes. The trained confidence map generation network model 220 may receive a pseudo label generated from unlabeled data and may generate a pseudo label corresponding to the received pseudo label. For example, each pixel value of the confidence map may be a value between "0" and "1". As each pixel value of the confidence map is closer to "1", the confidence level is higher. As each pixel value of the confidence map is closer to "0", the confidence level is lower.

The confidence map generation network model 220 may be composed of, for example, four convolution neural networks. For example, a size of a kernel of the confidence map generation network model 220 may be set to 3×3, and a size of a channel of the confidence map generation network model 220 may be set to 64. For example, the confidence map generation network model 220 may include two fully-connected layers at the end and may be set such that a probability value between "0" and "1" is output using a cross entropy loss function between a final output and the ground truth confidence map. An artificial neural network of the confidence map generation network model 220 is not limited to the above-mentioned structure.

The segmentation network model 230 may perform object region segmentation for an input image (e.g., an RGB image). For example, the segmentation network model 230 may be trained using a semi-supervised learning technique. For example, the segmentation network model 230 may be trained using a small amount of labeled data. The segmentation network model 230 trained using the labeled data may be trained using a large amount of pseudo-labeled data.

For example, the pseudo-labeled data may include an unlabeled RGB image as input data and may include a pseudo label of the unlabeled RGB image as output data. The pseudo label included in the pseudo-labeled data may be, for example, a pseudo label corresponding to at least one pixel, the confidence level of which is a greater than or equal to a threshold, on a confidence map generated by means of the confidence map generation network model 220 among pseudo labels generated by means of the pseudo label generation network model 210.

For example, the pseudo label corresponding to the at least one pixel, the confidence level of which is greater than or equal to the threshold, may be obtained by performing multiplication between pixels with a mask for the pseudo label generated by means of the pseudo label generation network model 210. The mask may be generated by allocating a pixel that is greater than or equal to the threshold on the confidence map to "1" and allocating a pixel that is less than the threshold to "0".

The segmentation network model 230 may be implemented using, for example, a DeepLabv3+ network model where ResNet-101 is a backbone network, but not limited thereto.

Figure 3:
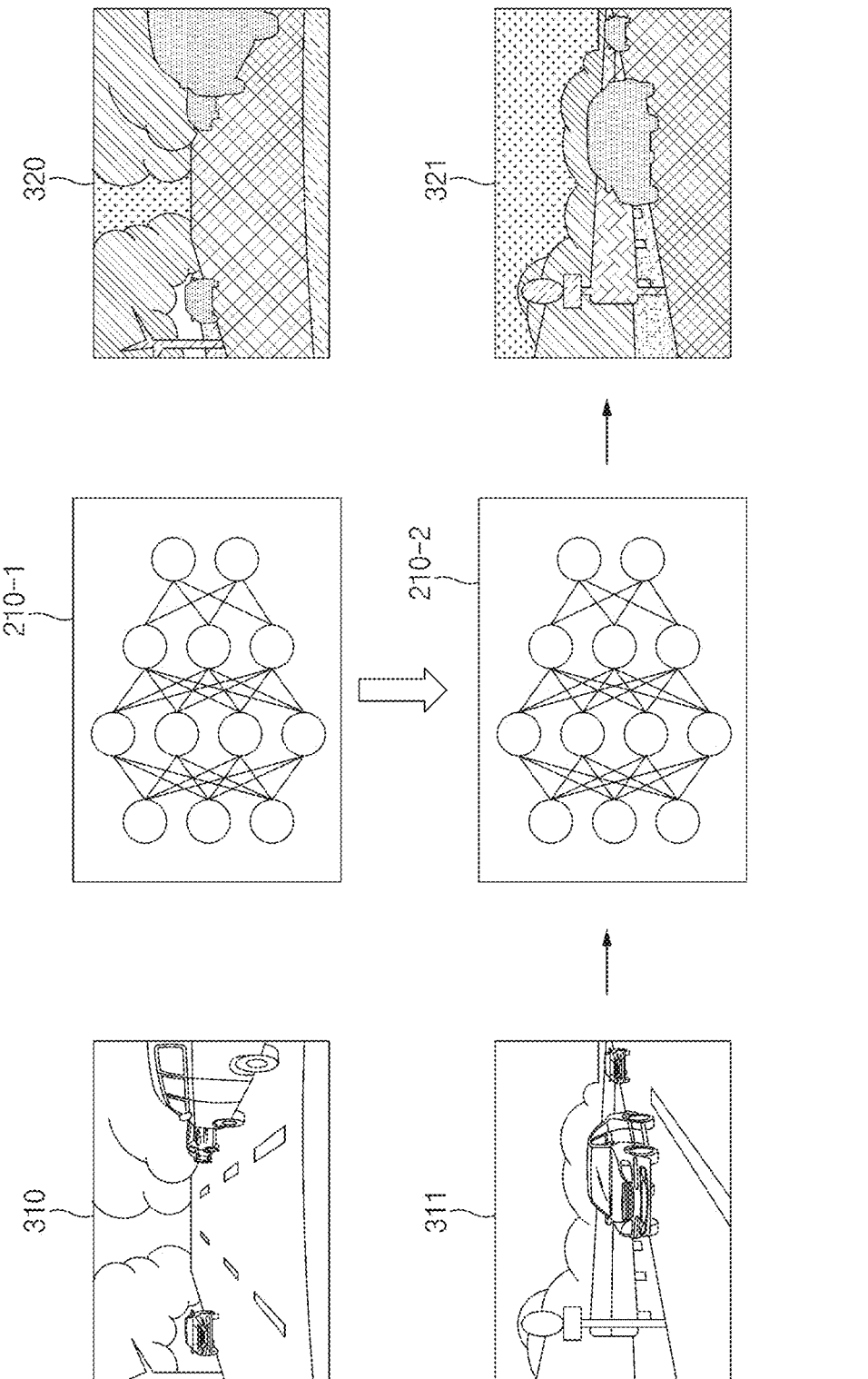
FIG. 3 is a drawing for describing a method for training a pseudo label generation network model according to an embodiment of the present disclosure.

FIG. 3 is a drawing for describing a method for training a pseudo label generation network model according to an embodiment of the present disclosure. Operations of the object region segmentation device, which are described below, may be performed by an object region segmentation device 100 of FIG. 1 or a processor 110 of the object region segmentation device 100. A pseudo label generation network model 210-1, which is described below, may correspond to a state before a pseudo label generation network model 210 of FIG. 2 is trained. A pseudo label generation network model 210-2, which is described below, may correspond to a state where the pseudo label generation network model 210 of FIG. 2 is trained.

Referring to FIG. 3, the object region segmentation device may train the pseudo label generation network model 210-1 using labeled data. The labeled data may include, for example, an RGB image 310 to be used as an input image and a correct answer label 320 which is the result of segmenting an object region for the RGB image 310. The result of segmenting the object region may include, for example, an image including a color value corresponding to an object class on a pixel-by-pixel basis. The object region segmentation device may train the pseudo label generation network model 210-1 using training data where the RGB image 310 is an input and the correct answer label 320 is an output.

The object region segmentation device may generate a pseudo label based on the trained pseudo label generation network model 210-2. The object region segmentation device may input unlabeled data to the trained pseudo label generation network model 210-2 to generate the pseudo label. For example, the unlabeled data may include an RGB image 311 with no correct answer label. For example, the object region segmentation device may input the RGB image 311 with no correct answer label to the trained pseudo label generation network model 210-2 to generate a pseudo label 321.

Figure 4:
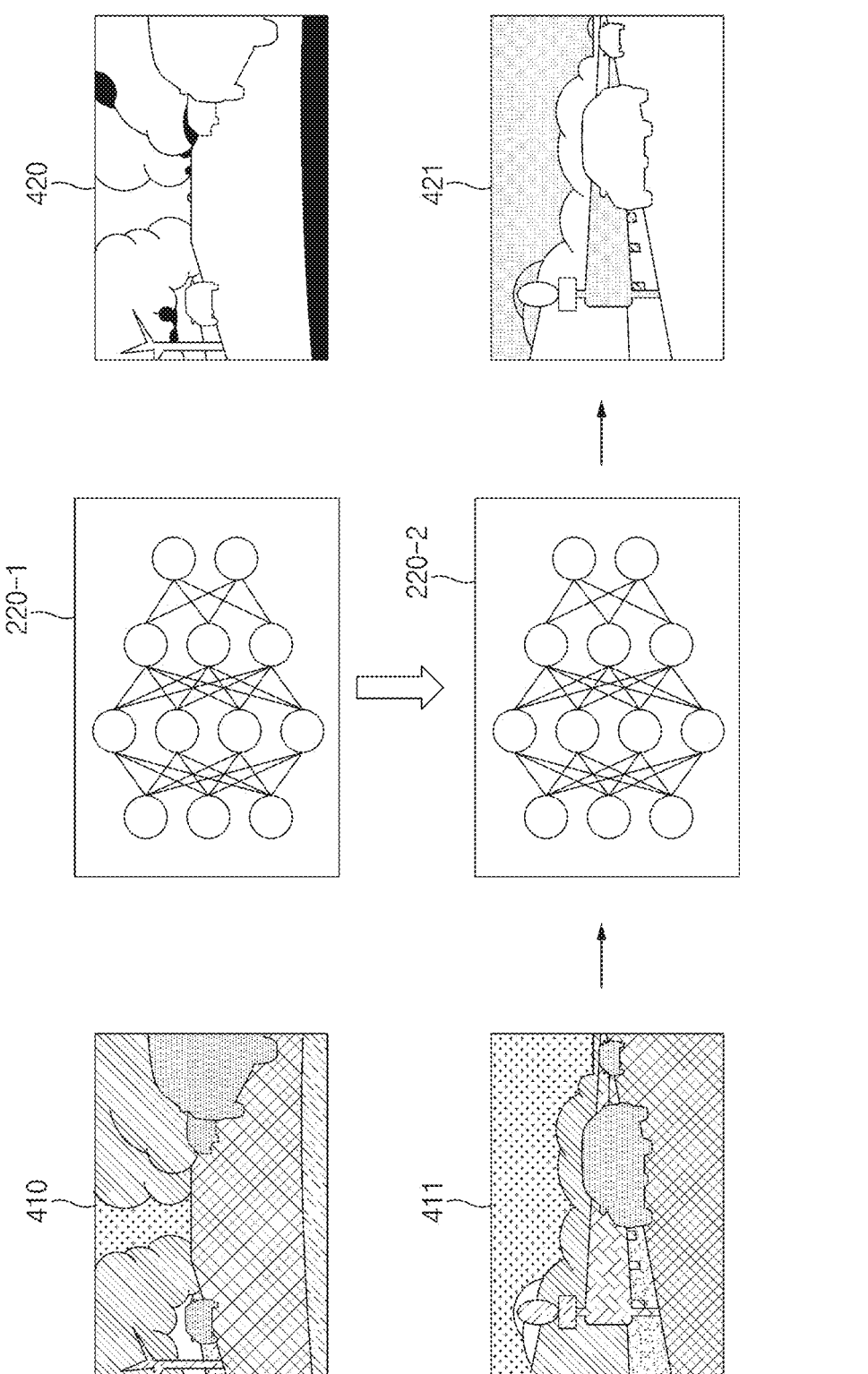
FIG. 4 is a drawing for describing a method for training and operating a confidence map generation network model according to an embodiment of the present disclosure.

FIG. 4 is a drawing for describing a method for training and operating a confidence map generation network model according to an embodiment of the present disclosure. Operations of the object region segmentation device, which are described below, may be performed by an object region segmentation device 100 of FIG. 1 or a processor 110 of the object region segmentation device 100. A confidence map generation network model 220-1, which is described below, may correspond to a state before a confidence map generation network model 220 of FIG. 2 is trained. A confidence map generation network model 220-2, which is described below, may correspond to a state where the confidence map generation network model 220 of FIG. 2 is trained.

Referring to FIG. 4, the object region segmentation device may train the confidence map generation network model 220-1 using a pseudo label 410 and a ground truth confidence map 420 generated based on the pseudo label 410 and a correct answer label. For example, the object region segmentation device may generate the pseudo label 410 for an RGB image with a correct answer label using a pseudo label generation network model (e.g., a trained pseudo label generation network model 210-2 of FIG. 3). For example, the object region segmentation device may compare a pixel at the same location of the pseudo label 410 and the correct answer label and may generate the ground truth confidence map 420 which is "1" when the pixel has the same class and is "0" when the pixel has a different class. The ground truth confidence map 420 may be, for example, an image, a value of each pixel of which is "0" or "1". The object region segmentation device may train the confidence map generation network model 220-1 using training data where the pseudo label 410 is an input and the ground truth confidence map 420 is an output.

The object region segmentation device may generate a confidence map based on the trained confidence map generation network model 220-2. The confidence map may be, for example, an image, a value of each pixel of which is "0" and "1". The object region segmentation device may input a pseudo label 411 generated for the RGB image with no correct answer label to the trained confidence map generation network model 220-2 to generate a confidence map 421. Each pixel of the confidence map 421 may indicate a confidence level for each pixel of the pseudo label 411. Each pixel of the confidence map 421 may have a value closer to "1" as the confidence level is higher and may have a value closer to "0" as the confidence level is lower.

Figure 5:
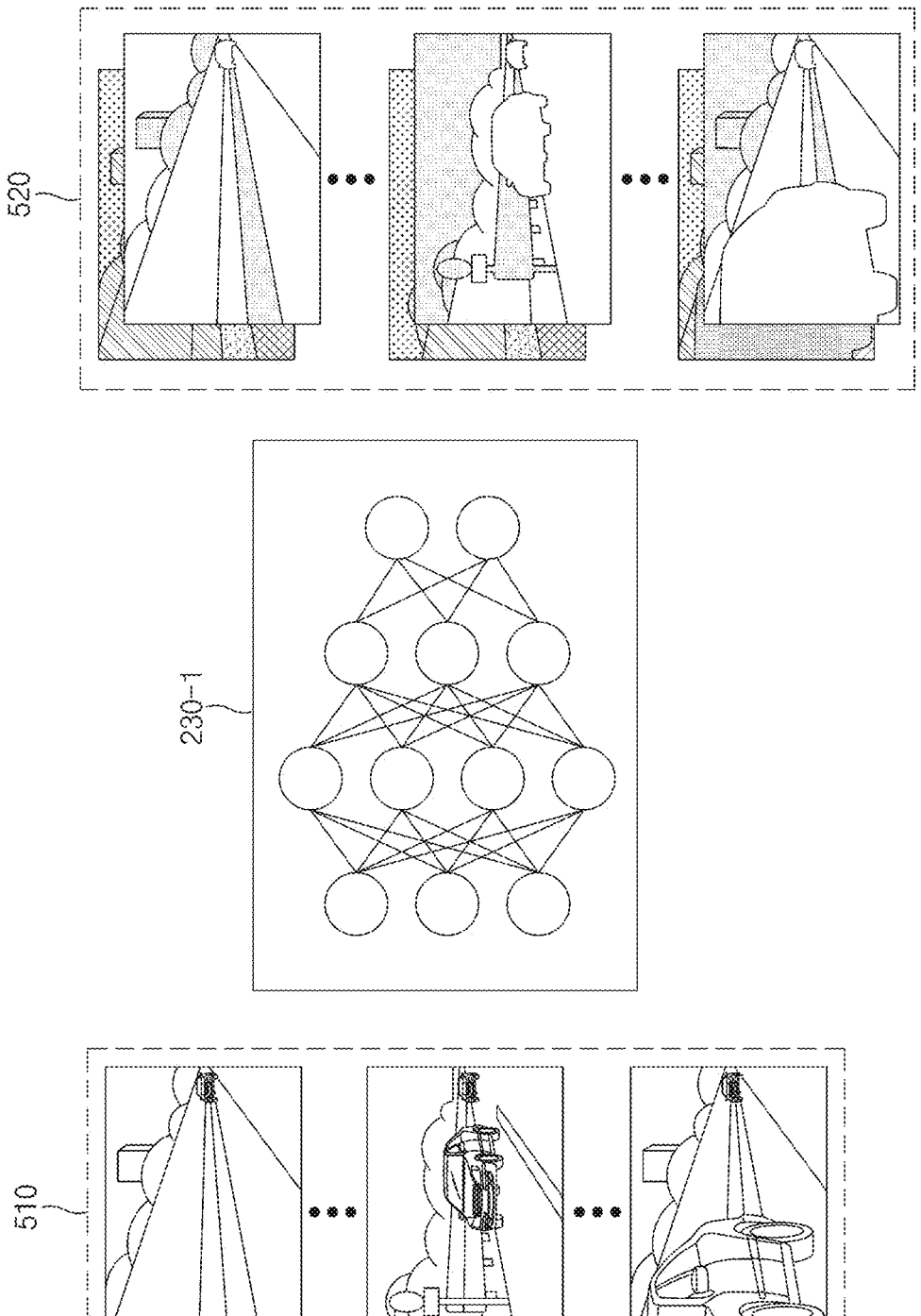
FIG. 5 is a drawing for describing a method for training a segmentation network model according to an embodiment of the present disclosure.

FIG. 5 is a drawing for describing a method for training a segmentation network model according to an embodiment of the present disclosure. Operations of the object region segmentation device, which is described below, may be performed by an object region segmentation device 100 of FIG. 1 or a processor 110 of the object region segmentation device 100. A segmentation network model 230-1, which is described below, may correspond to a state before a segmentation network model 230 of FIG. 2 is trained or a state where primary learning (or supervised learning) is performed using data with a correct answer label.

Referring to FIG. 5, the object region segmentation device may train the segmentation network model 230-1 using a large amount of unlabeled data. The unlabeled data may include, for example, an RGB image with no correct answer label and a confidence-guided pseudo label for the RGB image. The confidence-guided pseudo label may be referred to as a pseudo label corresponding to at least one pixel, a confidence level of which is greater than or equal to a threshold, on a confidence map corresponding to the pseudo label. For example, the confidence-guided pseudo label may correspond to the result of performing multiplication between a pixel of a mask generated based on the confidence map and a pixel of the pseudo label. A description is given below of a method for generating the mask with reference to FIG. 6.

For example, the object region segmentation device may train the segmentation network model 230-1 using training data including input data 510 including a plurality of RGB images and output data 520 including a plurality of confidence-guided pseudo labels respectively corresponding to the plurality of RGB images.

The object region segmentation device may train the segmentation network model 230-1 using a small amount of labeled data other than unlabeled data. For example, the object region segmentation device may train the segmentation network model 230-1 using training data where an RGB image with a correct answer label is an input and the correct answer label is an output.

Although not illustrated, the object region segmentation device may input an RGB image with no correct answer label to the trained segmentation network model to obtain the result of segmenting an object region.

Figure 6:
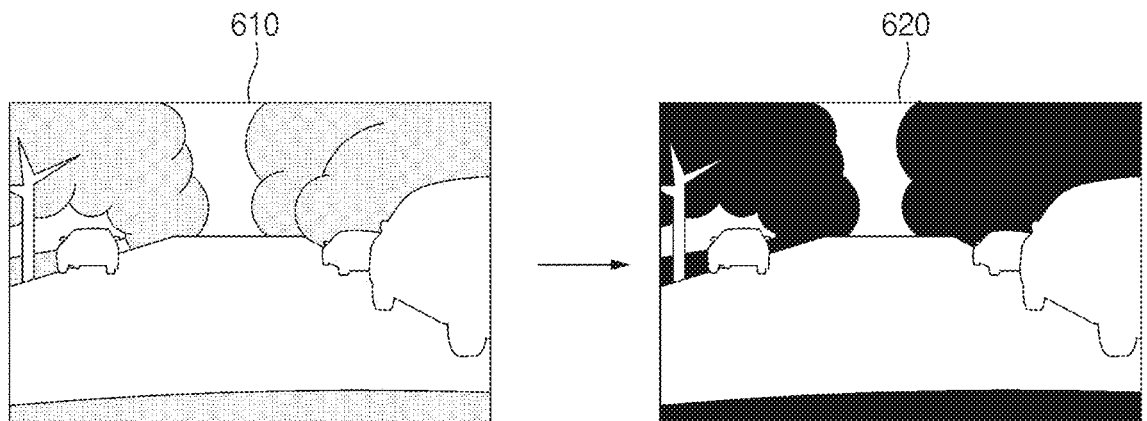
FIG. 6 is a drawing for describing a method for generating a mask according to an embodiment of the present disclosure.

FIG. 6 is a drawing for describing a method for generating a mask according to an embodiment of the present disclosure. Operations of the object region segmentation device, which are described below, may be performed by an object region segmentation device 100 of FIG. 1 or a processor 110 of the object region segmentation device 100.

Referring to FIG. 6, the object region segmentation device may generate a mask 620 from a confidence map 610. For example, each pixel value of the confidence map 610 may be a value between "0" and "1". Each pixel value of the confidence map may indicate a confidence level corresponding to each pixel of a pseudo label. The closer the pixel value is to "1", the higher the confidence level may be. The closer the pixel value is to "0", the lower the confidence level may be.

For example, the object region segmentation device may determine a pixel, the confidence level is greater than or equal to a threshold, on the confidence map as "1" and may determine a pixel, the confidence level of which is less than the threshold as "0", thus generating a mask corresponding the confidence map. The object region segmentation device may set the threshold based on, for example, a user input.

For example, the object region segmentation device may perform multiplication between the pixels for the generated mask and the pseudo label. The result of performing the multiplication between the pixel of the mask and the pixel of the pseudo label may be referred to as the confidence-guided pseudo label described above with reference to FIG. 5.

Figure 7:
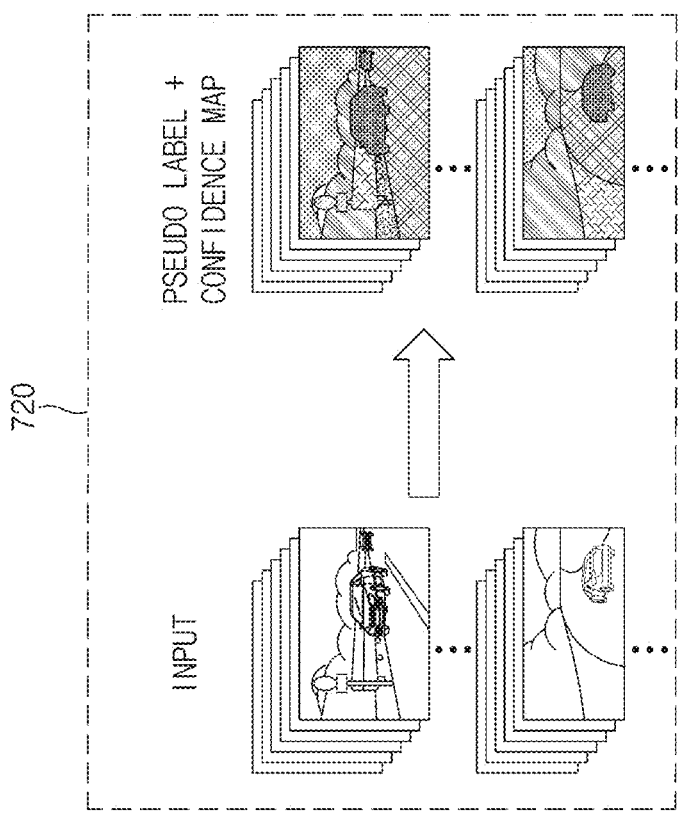
FIG. 7 is a drawing for describing a semi-supervised learning method according to an embodiment of the present disclosure.
Figure 7:
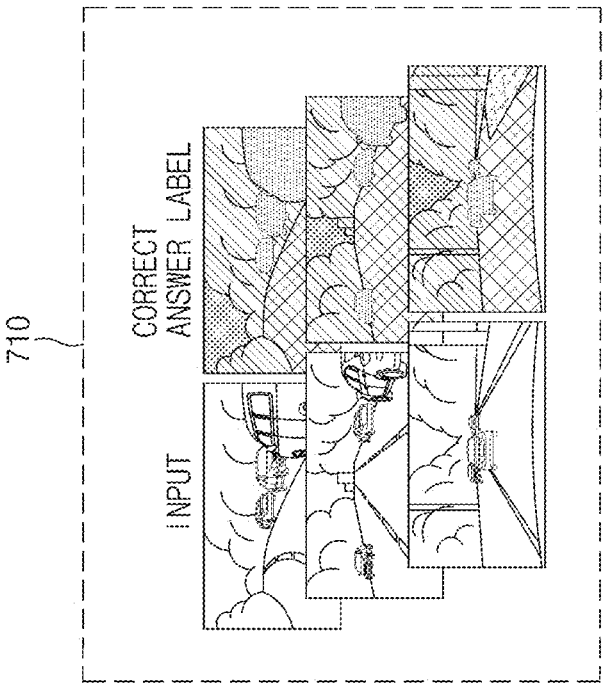

FIG. 7 is a drawing for describing a semi-supervised learning method according to an embodiment of the present disclosure. Operations of the object region segmentation device, which are described below, may be performed by an object region segmentation device 100 of FIG. 1 or a processor 110 of the object region segmentation device 100.

Referring to FIG. 7, the object region segmentation device 100 may train a segmentation network model using a semi-supervised learning technique. For example, the object region segmentation device 100 may perform supervised learning based on a first dataset 710. The first dataset 710 may include data with a correct answer label. For example, the object region segmentation device 100 may perform unsupervised learning based on a second dataset 720. The second dataset 720 may include data with no label. For example, the first dataset 710 may include a relatively small amount of data, and the second dataset 720 may include a relatively large amount of data.

For example, the first dataset 710 may include an input image and a correct answer label corresponding to the input image. The input image may be, for example, an RGB image. The correct answer label may be the result of segmenting an object region for the RGB image. The result of segmenting the object region may include, for example, a color value corresponding to an object class for each pixel of the input image.

For example, the second dataset 720 may include an input image, a pseudo label corresponding to the input image, and a confidence map corresponding to the pseudo label. The pseudo label corresponding to the input image may be generated using a pseudo label generation network model (e.g., a pseudo label generation network model 210 of FIG. 2) trained based on the first dataset 710. The confidence map corresponding to the pseudo label may be generated using a confidence map generation network model (e.g., a confidence map generation network model 220 of FIG. 2) trained based on a pseudo label generated by inputting the input image of the first dataset 710 to the pseudo label generation network model and a ground truth confidence map.

The ground truth confidence map may be generated by comparing a pixel at the same location between a pseudo label generated by inputting the input image of the first dataset 710 to the pseudo label generation network model and the correct answer label of the first dataset 710. For example, each pixel value of the ground truth confidence map may be "1" when the pixel at the same location between the pseudo label and the correct answer label has the same object class and may be "0" when the pixel at the same location between the pseudo label and the correct answer label has a different object class.

The confidence map may y be generated using the confidence map generation network model trained based on the pseudo label generated from the input image of the first dataset 710 and the ground truth confidence map. For example, the object region segmentation device may input the input image of the second dataset 720 to the trained confidence map generation network model to generate a confidence map. For example, each pixel value of the confidence map may be expressed as a value between "0" and "1".

For example, the object region segmentation device may select at least one pixel corresponding to a pixel, the confidence level of which is greater than or equal to a threshold, on the confidence map among all pixels of the pseudo label, upon training based on the second dataset 720, and may train a segmentation network model using only the selected at least one pixel. For example, the threshold may be a specified value between "0" and "1", which may be set based on a user input.

For example, the object region segmentation device may generate a mask where a pixel, the confidence level of which is greater than or equal to the threshold, on the confidence map is "1" and a pixel, the confidence level of which is less than the threshold, on the confidence map is "0" and may perform multiplication between the pixels of the mask and the pseudo label, thus selecting at least one pixel corresponding to the pixel, the confidence level of which is greater than or equal to the threshold, on the confidence map among all the pixels of the pseudo label.

The object region segmentation device may generate a confidence map for the pseudo label and may selectively use the pseudo label as training data based on the confidence level, thus improving the performance of the segmentation network model. The object region segmentation device may ensure a sufficient data amount of second dataset 720 through pseudo labeling, although there is a small amount of data of the first dataset 710, which is labeled data, and may use both the first dataset 710 and the second dataset 720 for training, thus improving the performance of the segmentation network model.

Figure 8:
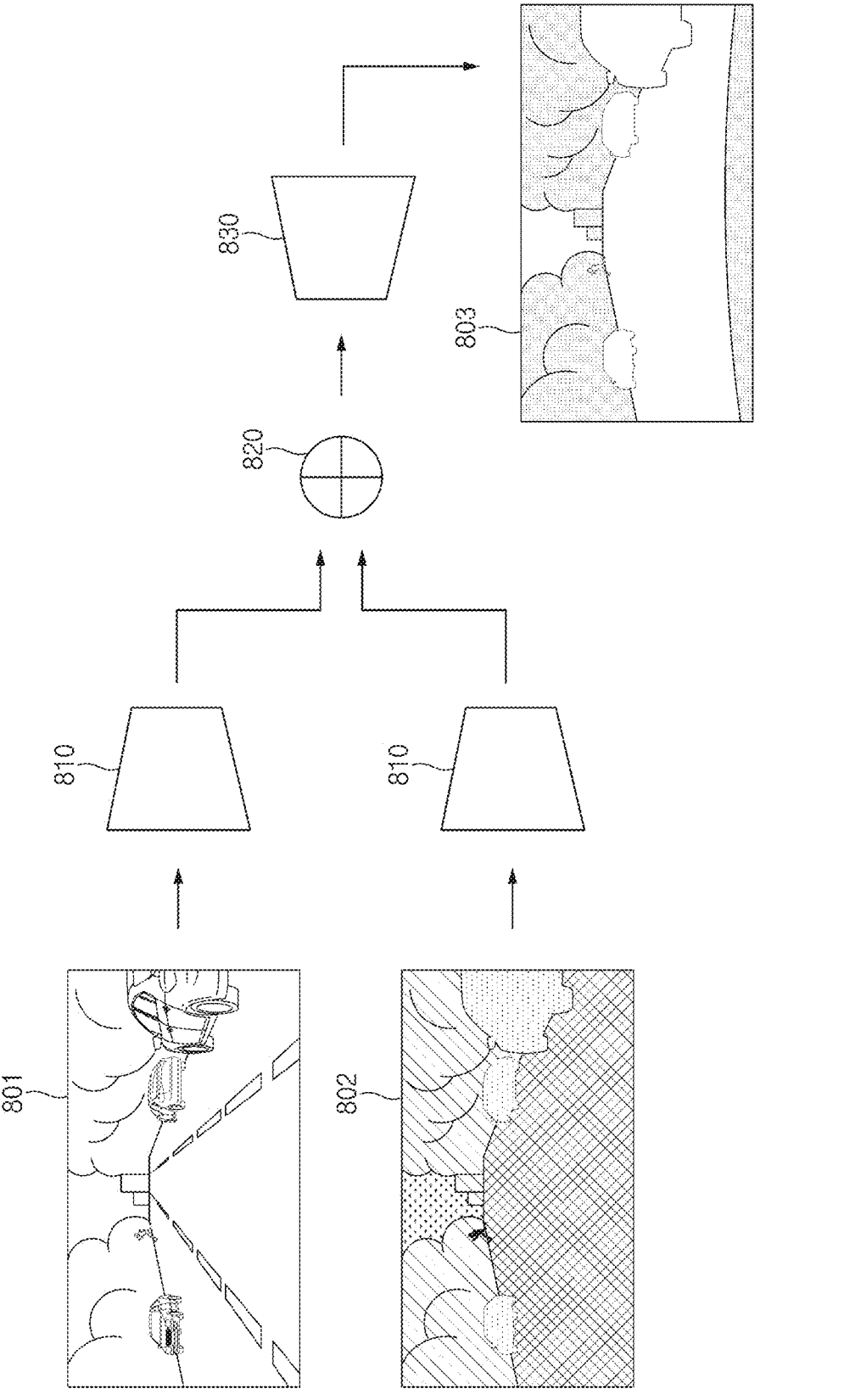
FIG. 8 is a drawing for describing a method for generating a confidence map according to an embodiment of the present disclosure.

FIG. 8 is a drawing for describing a method for generating a confidence map according to an embodiment of the present disclosure. Operations of the object region segmentation device, which are described below, may be performed by an object region segmentation device 100 of FIG. 1 or a processor 110 of the object region segmentation device 100. A confidence map generation network model, which is described below, may be a confidence map generation network model 220 of FIG. 2.

Referring to FIG. 8, for example, the object region segmentation device may input an RGB image 801 and a pseudo label 802 to the confidence map generation network model. For example, the confidence map generation network model may include an encoder 810, a concatenation operator 820, and a decoder 830. For example, the RGB image 801 and the pseudo label 802 may be input to the encoder 810.

For example, the encoder 810 may extract a first feature from the RGB image 801. The encoder 810 may extract a second feature from the pseudo label 802. The concatenation operator 820 may concatenate the first feature and the second feature, which are extracted by means of the encoder 810. The concatenation operator 820 may concatenate the features extracted from two inputs to fuse modalities of the two inputs. For example, the concatenation operator 820 may concatenate the first feature and the second feature to generate a third feature. For example, the decoder 830 may decode the third feature to generate a confidence map 803.

When generating the confidence map, the object region segmentation device may further use an RGB image corresponding to a pseudo label as an input image as well as the pseudo label, thus generating a more accurate confidence map.

Figure 9:
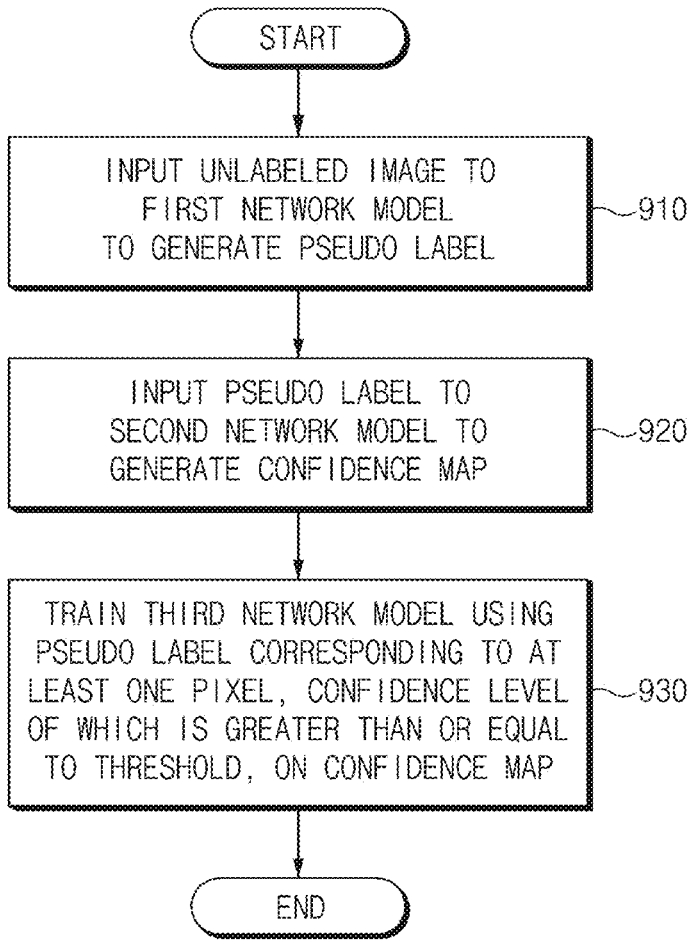
FIG. 9 is a flowchart illustrating an operation method of an object region segmentation device according to an embodiment of the present disclosure.

FIG. 9 is a flowchart illustrating an operation method of an object region segmentation device according to an embodiment of the present disclosure. Operations of the object region segmentation device, which are described below, may be performed by an object region segmentation device 100 of FIG. 1 or a processor 110 of the object region segmentation device 100. The object region segmentation device, which is described below, may store a deep-learning network model (e.g., a network model 200 of FIG. 2) for segmenting an object region in an image. The network model may include: a first network model (e.g., a pseudo label generation network model 210 of FIG. 2) for generating a pseudo label; a second network model (e.g., a confidence map generation network model 220 of FIG. 2) for generating a confidence map for the pseudo label; and a third network model (e.g., a segmentation network model 230 of FIG. 2) for segmenting an object region in an image.

In operation 910, the object region segmentation device may input an unlabeled image to the first network model to generate a pseudo label. For example, the first network model may be trained using labeled data. The labeled data may be referred to as an image with a correct answer label indicating the result of segmenting an object region for an RGB image.

In operation 920, the object region segmentation device may input the pseudo label to the second network model to generate a confidence map. For example, the object region segmentation device may compare a pixel at the same location of the pseudo label and the correct answer label. The pseudo label may be, for example, a pseudo label generated using the first network model for labeled data by the object region segmentation device. The correct answer label may be, for example, a correct answer label of the labeled data. The object region segmentation device may generate a ground truth confidence map which is "1" when the pixel has the same class as a result of the comparison and is "0" when the pixel has a different class as a result of the comparison. For example, the second network model may be trained based on the pseudo label and the ground truth confidence map.

The object region segmentation device may input the pseudo label generated for the unlabeled image in operation 920 to the trained second network model to generate the confidence map. For example, the confidence map may be expressed as a value between "0" and "1". As the confidence level is higher, the confidence map may be expressed as a value closer to "1". As the confidence level is lower, the confidence map may be expressed as a value closer to "0".

For example, the object region segmentation device may further input an RGB image corresponding to a pseudo label (e.g., an RGB image of an unlabeled image), as well as a pseudo label generated using the first network model (e.g., a pseudo label generated from the unlabeled image), to the confidence map generation network model. The object region segmentation device may extract a first feature from the RGB image using an encoder of the confidence map generation network model. The object region segmentation device may extract a second feature from the pseudo label using the encoder of the confidence map generation network model. The object region segmentation device may concatenate the first feature and the second feature to generate a third feature. The object region segmentation device may decode the third feature using a decoder of the confidence map generation network model. The object region segmentation device may further input the RGB image, as well as the pseudo label, to the confidence map generation network model, thus generating a more accurate confidence map.

In operation 930, the object region segmentation device may train the third network model using a pseudo label corresponding to at least one pixel, the confidence level of which is greater than or equal to a threshold, on the confidence map. For example, the object region segmentation device may generate a mask where a pixel, the confidence level of which is greater than or equal to the threshold, on the confidence map is "1" and a pixel, the confidence level of which is less than the threshold, on the confidence map is "0".

The object region segmentation device may perform multiplication between the pixels of the mask and the pseudo label. The object region segmentation device may train the second network model using the pseudo label where the multiplication between the pixels is performed. For example, the at least one pixel, the confidence level of which is greater than or equal to the threshold, on the confidence map may correspond to a pixel, a pixel value of which is "1" in the mask. For example, the object region segmentation device may set the threshold based on a user input.

For example, the object region segmentation device may train the third network model using a semi-supervised learning technique. The object region segmentation device may train the third network model using labeled data. The object region segmentation device may generate pseudo-labeled data using the pseudo label corresponding to the at least one pixel, the confidence level of which is greater than or equal to the threshold. For example, the pseudo-labeled data may be referred to as training data where an RGB image with no correct answer label is input data and the result of performing multiplication between pixels between the pseudo label corresponding to the RGB image and the mask is output data. The object region segmentation device may train the third network model using the pseudo-labeled data.

For example, a loss function of the third network model may be the sum of cross entropy for labeled data and cross entropy for data corresponding to at least one pixel, the confidence level of which is greater than or equal to the threshold, among unlabeled data. The at least one pixel, the confidence level of which is greater than or equal to the threshold, may be at least one pixel, the confidence level of the pseudo label of which is greater than or equal to the threshold. The object region segmentation device may train the third network model such that a value of the loss function is minimized.

Figure 10:
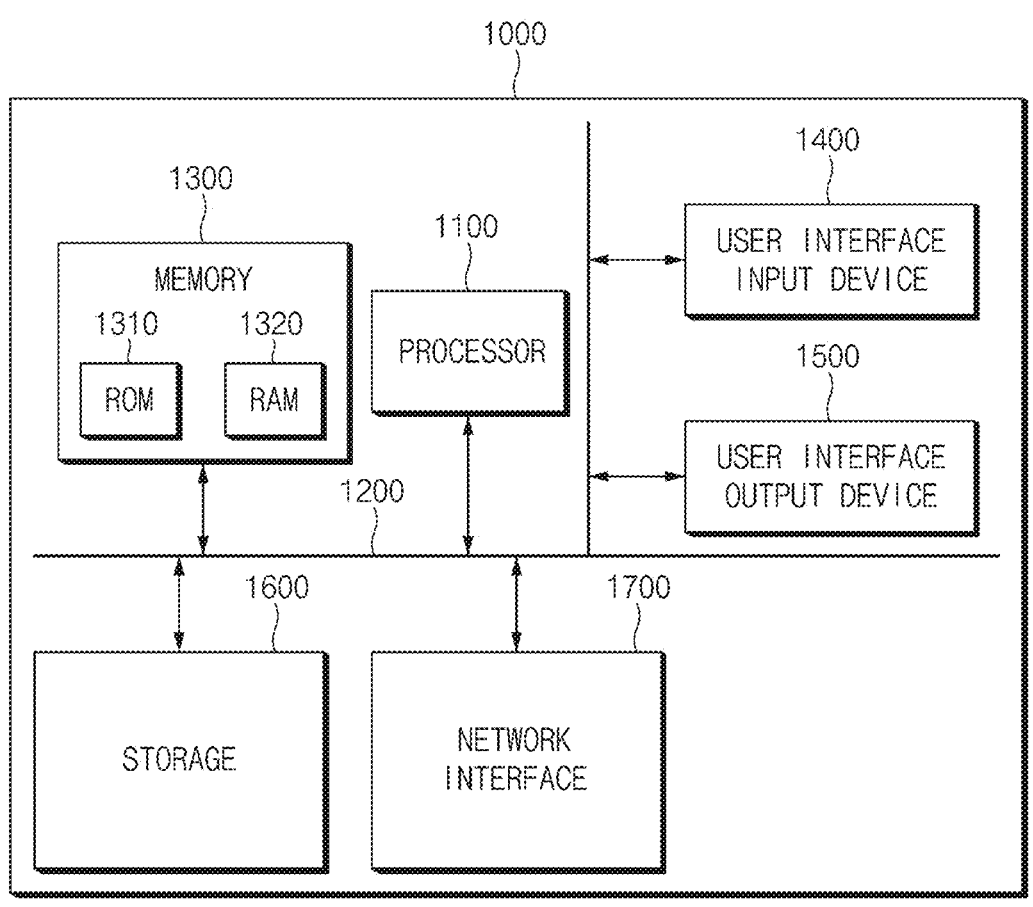
FIG. 10 illustrates a computing system according to an embodiment of the present disclosure.

FIG. 10 illustrates a computing system according to an embodiment of the present disclosure.

Referring to FIG. 10, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read-only memory (ROM) 1310 and a random-access memory (RAM) 1320.

Thus, the operations of the method or the algorithm described in connection with embodiments disclosed herein may be embodied directly in hardware or a software module executed by the processor 1100, or in a combination thereof. The software module may reside on a storage medium (i.e., the memory 1300 and/or the storage 1600) such as a RAM, a flash memory, a ROM, an erasable programmable ROM (EPROM), an electrically-erasable programmable ROM (EEPROM), a register, a hard disc, a removable disk, and a compact-disk ROM (CD-ROM).

The storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The present technology may provide the object region segmentation device and the object region segmentation method thereof, which are capable of improving the performance of a deep-learning network model for segmenting an object region in an image although training is performed using a small amount of labeled data.

Furthermore, the present technology may mitigate the dependence on massive labeled data sets and may reduce costs and time taken to collect labeled data.

In addition, various effects ascertained directly or indirectly through the present disclosure may be provided.

Hereinabove, although the present disclosure has been described with reference to embodiments and the accompanying drawings, the present disclosure is not limited thereto, but may be variously modified and altered by those having ordinary skill in the art to which the present disclosure pertains without departing from the spirit and scope of the present disclosure claimed in the following claims.

Therefore, embodiments of the present disclosure are provided to explain the spirit and scope of the present disclosure, but not to limit them, so that the spirit and scope of the present disclosure are not limited by the disclosed embodiments. The scope of the present disclosure should be construed based on the accompanying claims, and all the technical ideas within the scope equivalent to the claims should be included in the scope of the present disclosure.

What is claimed is:

1. An object region segmentation device, comprising:
a processor; and
a storage storing a deep-learning network model for segmenting an object region in an image,
wherein the deep-learning network model includes:
a first network model configured to generate a pseudo label;
a second network model configured to generate a confidence map for the pseudo label; and
a third network model configured to segment the object region in the image, and
wherein the processor is configured to:
input an unlabeled image to the first network model to generate the pseudo label;
input the pseudo label to the second network model to generate the confidence map; and
train the third network model using a pseudo label corresponding to at least one pixel on the confidence map, wherein a confidence level of the at least one pixel is greater than or equal to a threshold.

2. The object region segmentation device of claim 1, wherein the processor is further configured to:
train the first network model using labeled data.

3. The object region segmentation device of claim 1, wherein the processor is further configured to:
compare a pixel at the same location of the pseudo label and a correct answer label;
generate a ground truth confidence map which is "1" when the pixel has the same class as a result of the comparison and is "0" when the pixel has a different class as a result of the comparison; and
train the second network model based on the pseudo label and the ground truth confidence map.

4. The object region segmentation device of claim 1, wherein the confidence map is expressed as a value between "0" and "1", and
wherein the confidence map is expressed as a value closer to "1" as the confidence level is higher and is expressed as a value closer to "0" as the confidence level is lower.

5. The object region segmentation device of claim 1, wherein the processor is further configured to:
generate a mask where a pixel, the confidence level of which is greater than or equal to the threshold, is "1" and where a pixel, the confidence level of which is less than the threshold, is "0";
perform multiplication between the pixels of the mask and the pseudo label; and
train the third network model using the pseudo label where the multiplication between the pixels is performed.

6. The object region segmentation device of claim 1, wherein the processor is further configured to:
train the third network model using a semi-supervised learning technique.

7. The object region segmentation device of claim 6, wherein the processor is further configured to:
train the third network model using labeled data;
generate pseudo-labeled data using the pseudo label corresponding to the at least one pixel, the confidence level of which is greater than or equal to the threshold; and
train the third network model using the pseudo-labeled data.

8. The object region segmentation device of claim 1, wherein the second network model includes an encoder and a decoder, and
wherein the processor is further configured to:
extract a first feature from a red, green, and blue (RGB) image of the unlabeled image using the encoder;
extract a second feature from a pseudo label generated from the unlabeled image using the encoder;
concatenate the first feature and the second feature to generate a third feature; and
decode the third feature using the decoder.

9. The object region segmentation device of claim 1, wherein the third network model has a loss function which is the sum of cross entropy for labeled data and cross entropy for data corresponding to the at least one pixel, the confidence level of which is greater than or equal to the threshold, among unlabeled data, and
wherein the processor is further configured to:
train the third network model such that a value of the loss function is minimized.

10. The object region segmentation device of claim 1, wherein the processor is further configured to:
set the threshold based on a user input.

11. An object region segmentation method performed by an object region segmentation device, the object region segmentation method comprising:
inputting an unlabeled image to a first network model to generate a pseudo label, the first network model being configured to generate the pseudo label;
inputting the generated pseudo label to a second network model to generate a confidence map for the pseudo label, the second network model being configured to generate the confidence map; and
training a third network model configured to segment an object region in an image using a pseudo label corresponding to at least one pixel on the confidence map, wherein a confidence level of the at least one pixel is greater than or equal to a threshold.

12. The object region segmentation method of claim 11, further comprising:
training the first network model using labeled data.

13. The object region segmentation method of claim 11, further comprising:
comparing a pixel at the same location of the pseudo label and a correct answer label;
generating a ground truth confidence map which is "1" when the pixel has the same class as a result of the comparison and is "0" when the pixel has a different class as a result of the comparison; and
training the second network model based on the pseudo label and the ground truth confidence map.

14. The object region segmentation method of claim 11, wherein the confidence map is expressed as a value between "0" and "1", and
wherein the confidence map is expressed as a value closer to "1" as the confidence level is higher and is expressed as a value closer to "0" as the confidence level is lower.

15. The object region segmentation method of claim 11, wherein the training of the third network model includes:

generating a mask where a pixel, the confidence level of which is greater than or equal to the threshold, is "1" and where a pixel, the confidence level of which is less than the threshold, is "0";

performing multiplication between the pixels of the mask and the pseudo label; and training the third network model using the pseudo label where the multiplication between the pixels is performed.

16. The object region segmentation method of claim 11, wherein the training of the third network model includes:

training the third network model using a semi-supervised learning technique.

17. The object region segmentation method of claim 16, wherein the training of the third network model includes:

training the third network model using labeled data;

generating pseudo-labeled data using the pseudo label corresponding to the at least one pixel, the confidence level of which is greater than or equal to the threshold; and training the third network model using the pseudo-labeled data.

18. The object region segmentation method of claim 11, wherein the second network model includes an encoder and a decoder, and wherein the generating of the confidence map includes:

extracting a first feature from a red, green, and blue (RGB) image of the unlabeled image using the encoder;

extracting a second feature from a pseudo label generated from the unlabeled image using the encoder;

concatenating the first feature and the second feature to generate a third feature; and decoding the third feature using the decoder.

19. The object region segmentation method of claim 11, wherein the third network model has a loss function which is the sum of cross entropy for labeled data and cross entropy for data corresponding to the at least one pixel, the confidence level of which is greater than or equal to the threshold, among unlabeled data, and wherein the training of the third network model includes:

training the third network model such that a value of the loss function is minimized.

20. The object region segmentation method of claim 11, further comprising:

setting the threshold based on a user input.

* * * * *